(12) United States Patent
Kang et al.

(10) Patent No.: US 11,468,813 B2
(45) Date of Patent: Oct. 11, 2022

(54) METHOD AND DEVICE FOR DRIVING DISPLAY PANEL

(71) Applicant: Everdisplay Optronics (Shanghai) Co., Ltd., Shanghai (CN)

(72) Inventors: JehYen Kang, Shanghai (CN); Xiangshu Li, Shanghai (CN); Zhouhui Xia, Shanghai (CN); Keitaro Yamashita, Shanghai (CN)

(73) Assignee: Everdisplay Optronics (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/382,408

(22) Filed: Jul. 22, 2021

(65) Prior Publication Data

US 2022/0051599 A1    Feb. 17, 2022

(30) Foreign Application Priority Data

Aug. 11, 2020   (CN) .......................... 202010802714.X

(51) Int. Cl.
*G09G 3/20*  (2006.01)
*G09G 5/36*  (2006.01)

(52) U.S. Cl.
CPC ............. *G09G 3/20* (2013.01); *G09G 3/2003* (2013.01); *G09G 3/2007* (2013.01); *G09G 5/363* (2013.01); *G09G 2310/08* (2013.01); *G09G 2320/0247* (2013.01); *G09G 2320/0673* (2013.01); *G09G 2320/103* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| 2011/0148826 A1* | 6/2011 | Koyama | .............. | G09G 3/3696 345/204 |
| 2011/0175895 A1* | 7/2011 | Hayakawa | .............. | G11C 19/28 345/212 |
| 2016/0093248 A1* | 3/2016 | Shimizu | ............... | G09G 3/3225 345/691 |
| 2018/0024386 A1* | 1/2018 | Kim | ...................... | G02F 1/0123 349/36 |

* cited by examiner

*Primary Examiner* — Dorothy Harris
(74) *Attorney, Agent, or Firm* — Qinghong Xu

(57) ABSTRACT

The present disclosure provides a method and device for driving a display panel. The method includes steps of: presetting a mapping database of correspondence between each of first voltages and a respective one of image refresh rates; sending a refresh rate adjustment instruction to a timing controller; switching the image refresh rate from the first image refresh rate to the second image refresh rate according to the refresh rate adjustment instruction, and sending a voltage adjustment instruction to a power driving chip; obtaining the first voltage according to the voltage adjustment instruction and the mapping database; obtaining the pixel driving voltage according to the preset correspondence between the first voltage and the pixel driving voltage; and adjusting the display panel according to the pixel driving voltage to change the operating current of each pixel.

15 Claims, 3 Drawing Sheets

METHOD AND DEVICE FOR DRIVING DISPLAY PANEL

CROSS-REFERENCE TO RELEVANT APPLICATION

The present application claims the priority of the Chinese patent application No. 202010802714.X, filed on Aug. 11, 2020, the entire disclosure of which is incorporated herein by reference for all purposes.

TECHNICAL FIELD

The present disclosure relates to the technical field of display devices, and in particular to a method and device for driving a display panel.

BACKGROUND

Seamless Dynamic Refresh Rate Switching (SDRRS) technology is a power-saving technology for notebook computers proposed by Intel Corporation. When the display panel of the notebook computer is in the state of displaying a static image, the image refresh rate thereof can be switched from 60 Hz to 40 Hz, in order to achieve the purpose of effectively reducing the power consumption of the display, i.e., saving power.

However, when the display panel is switched to a different refresh rate, the charging and discharging time of the display panel will be different. Thus, the brightness of the screen will be different, and the flicker will be felt by human eyes. Specifically, for example, when the image refresh rate of the display panel is 60 Hz, and the charging time is shorter, the brightness is thus lower. In the case of a refresh rate of 40 Hz, the charging time is longer, and thus the brightness is higher. Therefore, when the SDRRS technology is turned on and off, the brightness difference will be caused due to frequency switching. For human eyes, they are less sensitive to the brightness change at high brightness, but in a low grayscale state (i.e., at low brightness), human eyes are more sensitive to the brightness change. The larger the brightness change, the easier it is to be captured.

SUMMARY

According to an aspect of the present disclosure, there is provided a driving method of a display panel, including the following steps:

S10, presetting a mapping database of correspondence between each of first voltages and a respective one of image refresh rates;

S20: in response to a graphics processor detecting that the display panel is switched from a dynamic image to a static image, send a refresh rate adjustment instruction to a timing controller;

S30: switching, by the timing controller, the image refresh rate of the display panel from the first image refresh rate to the second image refresh rate according to the refresh rate adjustment instruction, and sending a voltage adjustment instruction to a power driving chip;

S40, obtaining, by the power driving chip, the first voltage matching the second image refresh rate according to the voltage adjustment instruction and the mapping database;

S50, obtaining a pixel driving voltage corresponding to the first voltage according to a preset correspondence between the first voltage and the pixel driving voltage; and S60, adjusting the display panel according to the pixel driving voltage to change the operating current of each pixel.

In an embodiment, the step S20 includes:

determining, by the graphics processor, whether the seamless dynamic refresh rate switching technology is switched from the off state to the on state, and if so, determining that the display panel is switched from the dynamic image to the static image.

In an embodiment, the preset correspondence between the first voltage and the pixel driving voltage is:

$$V_{data} = GammaH - \frac{GammaH - GammaL}{2^{bit} - 1} * \text{Data},$$

where, $V_{data}$ represents the pixel driving voltage, GammaH is the first voltage, GammaL represents the minimum value of the Gamma voltage, bit represents the color depth, $2^{bit}$ represents the grayscale number the display panel, and Data represents the coded data value of the Gamma voltage.

In an embodiment, the first voltage is the maximum value of the Gamma voltage; and in the mapping database, the first voltage increases as the image refresh rate decreases, while the first voltage decreases as the image refresh rate increases.

In an embodiment, the first image refresh rate is greater than the second image refresh rate, and the first voltage matching the second image refresh rate is greater than a first voltage matching the first image refresh rate.

In an embodiment, the step S60 includes:

setting the driving voltage of each pixel in the display panel to be the pixel driving voltage to reduce the operating current of each pixel.

In an embodiment, the operating current and the pixel driving voltage of each pixel meet the following relationship of:

$$I = k^*(ELVDD - V_{data})^2$$

where, I represents the operating current of each pixel, k is a fixed value greater than 0, and ELVDD represents the power supply voltage.

According to another aspect of the present disclosure, there is provided a driving device of a display panel, which is configured to implement the above-mentioned driving method of the display panel. The driving device includes:

a database setting unit, configured to preset a mapping database of correspondence between each of first voltages and a respective one of image refresh rates;

a refresh rate adjustment instruction sending unit, configured to, in response to the graphics processor detecting that the display panel is switched from a dynamic image to a static image, send a refresh rate adjustment instruction to a timing controller;

a timing controller, configured to switch the image refresh rate of the display panel from the first image refresh rate to the second image refresh rate according to the refresh rate adjustment instruction, and send a voltage adjustment instruction to a power driving chip;

the power driving chip, configured to obtain the first voltage matching the second image refresh rate according to the voltage adjustment instruction and the mapping database;

a pixel driving voltage determination unit, configured to obtain the pixel driving voltage corresponding to the first voltage according to the preset correspondence between the first voltage and the pixel driving voltage; and a display panel adjustment unit, configured to adjust the display panel according to the pixel driving voltage to change the operating current of each pixel.

In an embodiment, in response to the graphics processor detecting that the seamless dynamic refresh rate switching technology is switched from the off state to the on state, and the display panel is switched from the dynamic image to the static image, a refresh rate adjustment instruction is sent to the timing controller.

In an embodiment, the first voltage is the maximum value of the Gamma voltage.

BRIEF DESCRIPTION OF THE DRAWINGS

The drawings here are incorporated into the specification and constitute a part of the specification, show embodiments in accordance with the present disclosure, and are used together with the specification to explain the principle of the present disclosure. Obviously, the drawings in the following description are only some embodiments of the present disclosure. For those of ordinary skill in the art, other drawings can be obtained based on these drawings without creative work.

DETAILED DESCRIPTION OF THE EMBODIMENTS

Figure 1:
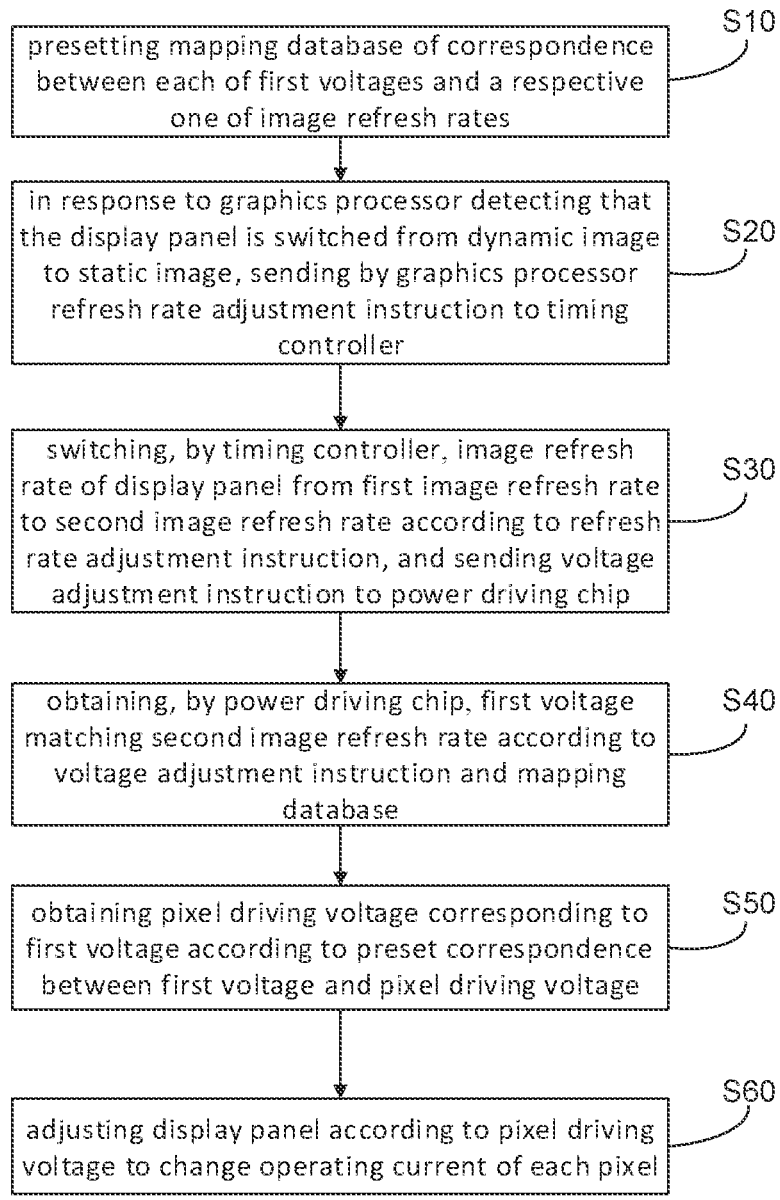
FIG. 1 is a schematic diagram for a driving method of a display panel disclosed in an embodiment of the present disclosure.

Example embodiments will now be described more fully with reference to the accompanying drawings. However, the example embodiments can be implemented in various forms, and should not be construed as being limited to the embodiments set forth herein. On the contrary, these embodiments are provided so that the present disclosure will be comprehensive and complete, and will fully convey the concept of example embodiments to those skilled in the art. The same reference numerals in the figures indicate the same or similar structures, and thus their repeated description will be omitted.

As shown in FIG. 1, the present disclosure discloses a method for driving a display panel, which is used to solve the problem that when the SDRRS technology is turned on in a notebook computer and the display panel is switched from a dynamic image to a static image or switched from a static image to a dynamic image, the brightness difference generated by the display panel is too large, causing flicker.

The driving method of the display panel disclosed in an embodiment includes the following steps.

In S10, a mapping database of correspondence between each of the first voltages and a respective one of the image refresh rates is preset. The above-mentioned first voltage is the maximum value of the Gamma voltage. Specifically, the Gamma voltage of the display panel is a parameter used to characterize the brightness response characteristics of the display, and it is a value determining the display from black to white. Simply put, when displaying a color from black to white (that is, from 0 to 1), the voltage of the display also changes, but this change is not linear. Because the physical characteristics of the display determine that if the voltage change is linear, the displayed brightness is not linear. At this time, the displayed brightness will be very dark. Therefore, in order to ensure that the displayed brightness is normal (linear), it is necessary to correct the voltage change of the display. The value used for correction is the Gamma value.

In the mapping database, the smaller the image refresh rate, the larger the first voltage. That is, the first voltage increases as the image refresh rate decreases, and the first voltage also decreases as the image refresh rate increases. That is, there is a negative correlation between the image refresh rate and the first voltage.

hi the prior art, when the image refresh rate changes, the first voltage (i.e., the maximum value of the Gamma voltage) remains unchanged. For example, when switching from 60 Hz to 40 Hz, in the case of 60 Hz, the charging time is shorter and the brightness is lower; while in the case of 40 Hz, the charging time is longer and the brightness is higher. The brightness difference is large during the switching process, which makes human eyes feel the phenomenon of flicker. According to the present application, when the image refresh rate decreases, the maximum value of the Gamma voltage is increased, so that the driving voltage of the pixel is increased, thereby reducing the operating current of the pixel. Thus, the brightness value is reduced compared to the corresponding brightness at 40 Hz in the prior art. That is, after the refresh rate is reduced, the increase in brightness is reduced to avoid the occurrence of flicker.

In S20, in response to the graphics processor detecting that the display panel is switched from a dynamic image to a static image, the graphics processor sends a refresh rate adjustment instruction to the timing controller. Specifically, in an embodiment, the graphics processor determines whether the seamless dynamic refresh rate switching technology is switched from the off state to the on state, and if so, it is determined that the display panel is switched from a dynamic image to a static image. Otherwise, the current image refresh rate is maintained. After determining that the display panel is switched from a dynamic image to a static image, the graphics processor sends a refresh rate adjustment instruction to the timing controller. That is, the graphics processor instructs the timing controller to reduce the image refresh rate, in order to reduce the power consumption and achieve the purpose of energy saving.

In S30, the timing controller switches the image refresh rate of the display panel from the first image refresh rate to the second image refresh rate according to the refresh rate adjustment instruction, and sends a voltage adjustment instruction to the power driving chip. The first image refresh rate is greater than the second image refresh rate. That is, the image refresh rate is reduced, and the power consumption is reduced.

In S40, the power driving chip obtains a first voltage matching the second image refresh rate according to the voltage adjustment instruction and the mapping database. The second image refresh rate is less than the first image refresh rate, and in the mapping database, there is a negative correlation between the image refresh rate and the first voltage. Therefore, in an embodiment, the first voltage matching the second image refresh rate is greater than the first voltage matching the first image refresh rate.

In S50, a pixel driving voltage corresponding to the above-mentioned first voltage is obtained according to a preset correspondence between the first voltage and the pixel driving voltage. Specifically, in an embodiment, the above-mentioned preset correspondence between the first voltage and the pixel driving voltage is:

$$V_{data} = GammaH - \frac{GammaH - GammaL}{2^{bit} - 1} * Data,$$

wherein, $V_{data}$ represents the pixel driving voltage, GammaH represents the above-mentioned first voltage, GammaL represents the minimum value of the Gamma voltage, bit represents the color depth, $2^{bit}$ represents the grayscale number of the display panel, and Data represents the coded data value of the Gamma voltage. GammaL and Data are both fixed values. After the production and debugging of the display panel is completed, the Data value corresponding to each grayscale of the display panel is determined. There is a one-to-one correspondence between the Data value and the grayscale number, and the Data value and the grayscale number are positively correlated. For example, the Data value can be 500, and the GammaL value can be 3V. Of course, the present application is not limited in this regard.

The grayscale number of the display panel is determined according to the display panel. Taking an 8-bit display panel as an example, the display panel can represent 256 brightness levels, which is equal to $2^8$, called 0-255 grayscales.

It can be seen from the above correspondence that when the GammaH value increases, $V_{data}$ also increases. Therefore, the pixel driving voltage corresponding to the first voltage matched with the second image refresh rate is greater than the pixel driving voltage corresponding to the first voltage matched with the first image refresh rate.

Figure 2:
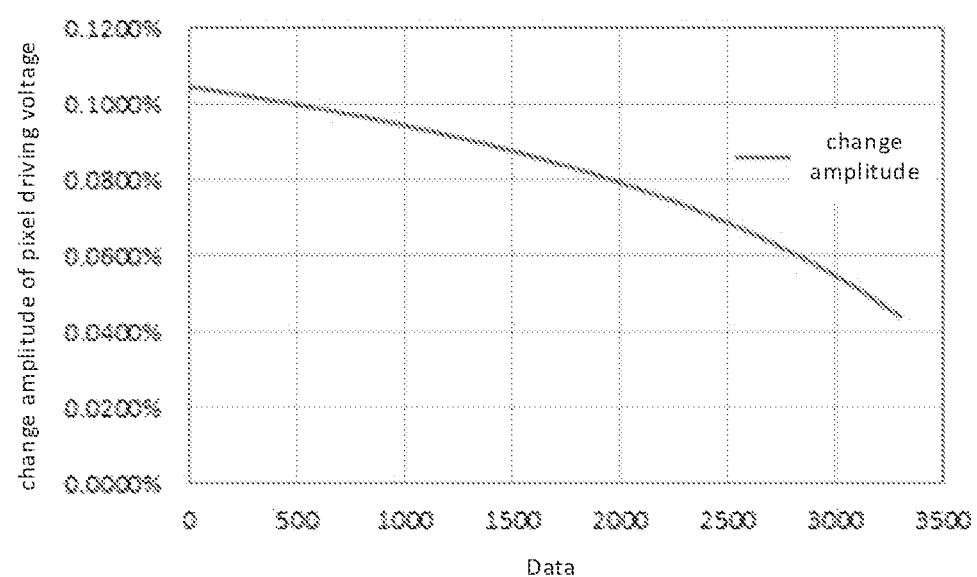
FIG. 2 is a schematic diagram showing a variation curve of the pixel driving voltage as the encoded data value Data of the Gamma voltage changes.

FIG. 2 is a schematic diagram showing the varianance curve of the pixel driving voltage as the encoded data value Data of the Gamma voltage changes. It can be seen from FIG. 2 that when the Data value is small, i.e., when the grayscale of the display panel is low, the driving method of the display panel provided by the present disclosure can make the change amplitude of the corresponding pixel driving voltage, namely $\Delta V_{data}$, more obvious, thereby achieving a better improvement effect when the display panel is in a low grayscale state. For example, when the Data value is 500, the pixel driving voltage changes by 0.1000%. That is, the pixel driving voltage increases by 0.1%. When the Data value is approximately 2800, the pixel driving voltage changes only by 0.06%. That is, the pixel driving voltage only increases by 0.06%. Thus, the improvement effect is not as obvious as that when the Data value is 500.

When a display panel is in a low grayscale state, for example, regarding a display panel with 0-255 grayscales, a low grayscale state can be a case when the display panel is in a 64 gray scale state. At this time, no matter whether the display panel is switched from high brightness to low brightness or from low brightness to high brightness, there will be obvious brightness changes, which can be sensed by human eyes. However, the improvement effect of the present application in the low grayscale state is particularly obvious, Exemplarily, the present application has tested the low grayscale state of a display panel at 0-128 grayscales, and the comparison of the brightness change before and after the application of the present disclosure is shown in Table 1 below.

TABLE 1

| gralscale | brightness | | | amplitude of brightness change | |
|---|---|---|---|---|---|
| | 60 Hz | 40 Hz | 40 Hz voltage adjustment | no voltage adjustment | voltage adjustment |
| 0 | 0.003 | 0.003 | 0.003 | 0.000% | 0.000% |
| 16 | 1.07 | 1.21 | 1.11 | −13.084% | −3.738% |
| 32 | 5.22 | 5.54 | 5.27 | −6.130% | −0.958% |
| 64 | 24.65 | 25.71 | 24.53 | −4.3000% | 0.487% |
| 96 | 58.99 | 60.62 | 59.18 | −2.763% | −0.322% |
| 128 | 110.41 | 112.9 | 110.36 | −2.255% | 0.045% | where, the amplitude of brightness change is $$\Delta Lv = \frac{(Lv_{60\ Hz} - Lv_{40\ Hz})}{Lv_{60\ Hz}} * 100\%.$$

For example, when the grayscale number is 32, for the prior art, the brightness of the display at the image refresh rate of 60 Hz is 5.22 nit, and when the image refresh rate is adjusted to be 40 Hz, the brightness of the display is 5.54 nit. Then, the amplitude of brightness change $\Delta Lv$ is −6.13%. After applying the driving method of the display panel provided by the present disclosure, when the image refresh rate is adjusted to 40 Hz, the display brightness is 5.27 nit, and the amplitude of brightness change $\Delta Lv$ is −0.958% at this time. Therefore, it can be seen that after adopting the technical solution provided by the present disclosure, the amplitude of brightness change is significantly reduced, thereby avoiding the occurrence of flicker when switching frequencies.

In S60, the display panel is adjusted according to the pixel driving voltage to change the operating current of each pixel, so as to achieve the purpose of adjusting the brightness of the display panel. Specifically, the driving voltage of each pixel in the above-mentioned display panel is set to be the above-mentioned pixel driving voltage to reduce the operating current of each pixel.

The above-mentioned operating current and the above-mentioned pixel driving voltage of each pixel satisfy the following relationship:

$$I = k*(ELVDD - V_{data})^2$$

where, I represents the operating current of each pixel; k is a fixed value greater than 0, for example, k can be 0.5; and ELVDD represents the power supply voltage. It can be seen from the above formula that as the pixel driving voltage $V_{data}$ increases, the pixel operating current I decreases. That is, the pixel operating current I and the pixel driving voltage $V_{data}$ have a negative correlation, while the brightness of the display and the pixel operating current I are positively correlated of. Therefore, as the pixel driving voltage $V_{data}$ increases, the brightness of the display decreases accordingly.

It should be noted that the driving method of the display panel provided in the present application can also be applied to the case where the display panel is switched from a static image to a dynamic image. In this case, the graphics processor sends a refresh rate adjustment instruction to the timing controller. Then, according to the refresh rate adjustment instruction, the timing controller switches the image refresh rate of the display panel from a third image refresh rate to a fourth image refresh rate, and sends a voltage adjustment instruction to the power driving chip. The power driving chip obtains a second voltage matching the fourth image refresh rate according to the voltage adjustment instruction and the above-mentioned mapping database. Then, the pixel driving voltage corresponding to the second voltage is obtained according to the above-mentioned correspondence, and the display panel is adjusted according to the pixel driving voltage to change the operating current of each pixel. The third image refresh rate is less than the fourth image refresh rate.

At this time, it is necessary to reduce the second voltage correspondingly, that is, to reduce the maximum value of the Gamma voltage. Thus, the pixel driving voltage is reduced to increase the operating current of each pixel, thereby achieving the purpose of increasing the brightness of the display panel. Also, it is achieved that when the image refresh rate of the display panel increases, the brightness difference before and after the brightness decrease is reduced, so as to avoid the occurrence of flicker. The above technical solutions are also falling within the protection scope of the present disclosure.

Figure 3:
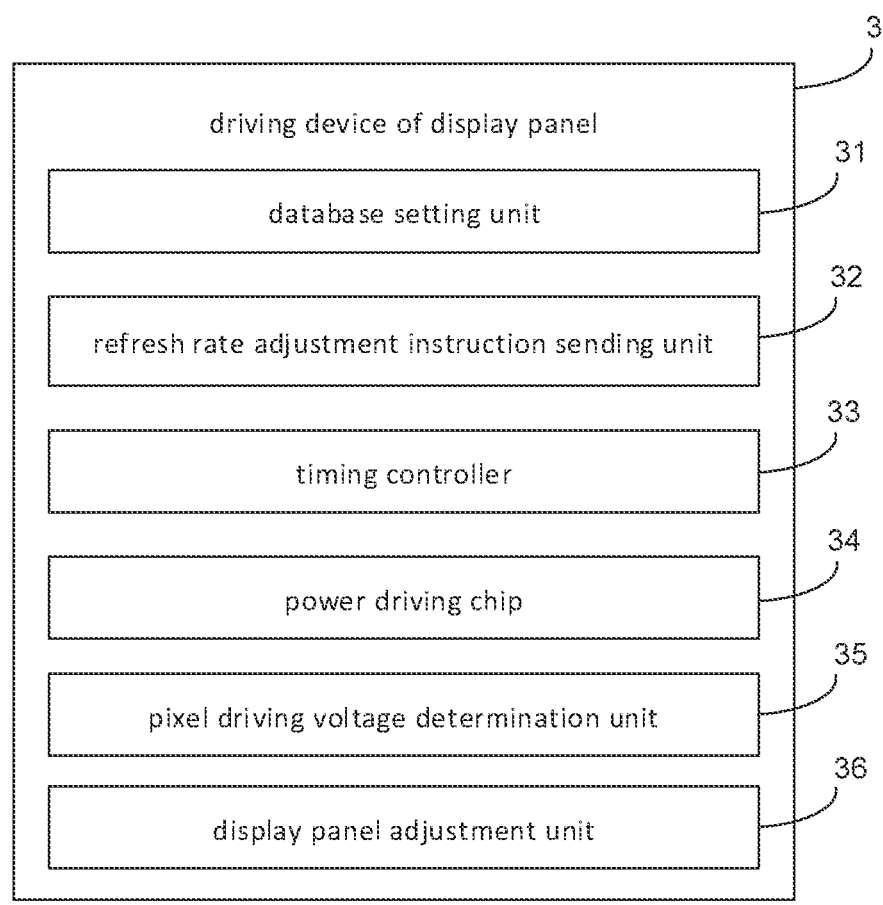
FIG. 3 is a schematic structural diagram for a driving device of a display panel disclosed in an embodiment of the present disclosure.

As shown in FIG. 3, an embodiment of the present disclosure also discloses a driving device 3 of a display panel, which includes:

a database setting unit 31, configured to preset a mapping database of correspondence between each of first voltages and a respective one of image refresh rates;

a refresh rate adjustment instruction sending unit 32, configured to send a refresh rate adjustment instruction to a timing controller, in response to the graphics processor detecting that the display panel is switched from a dynamic image to a static image;

the timing controller 33, configured to switch the image refresh rate of the display panel from the first image refresh rate to the second image refresh rate according to the refresh rate adjustment instruction, and send a voltage adjustment instruction to a power driving chip;

a power driving chip 34, configured to obtain the first voltage matching the second image refresh rate according to the voltage adjustment instruction and the mapping database;

a pixel driving voltage determination unit 35, configured to obtain the pixel driving voltage corresponding to the above-mentioned first voltage according to the preset correspondence between the first voltage and the pixel driving voltage; and a display panel adjustment unit 36, configured to adjust the display panel according to the pixel driving voltage to change the operating current of each pixel.

When detecting that the seamless dynamic refresh rate switching technology is switched from an off state to an on state, and the display panel is switched from a dynamic image to a static image. The above-mentioned graphics processor sends a refresh rate adjustment instruction to the timing controller.

The above-mentioned first voltage is the maximum value of the Gamma voltage.

It can be understood that the driving device of the display panel according to the present disclosure also includes other existing functional modules that support the operation of the driving device of the display panel. The driving device of the display panel shown in FIG. 3 is only an example, and should not bring any limitation to the function and application scope of embodiments of the present disclosure.

The driving device of the display panel in the above embodiment is used to implement the above-mentioned driving method of the display panel Therefore, for the specific implementation steps of the driving device of the display panel, the description of the above-mentioned driving method of the display panel can be referred to, and no repeated description will be provided herein.

In summary, the driving method and device of the display panel of the present disclosure have at least the following advantages.

According to driving method and device of the display panel disclosed in an embodiment, it is detected whether the display panel is switched from a dynamic image to a static image, thereby controlling the switching of the image refresh rate. When the image refresh rate is reduced, the maximum value of the Gamma voltage is increased. Thus, the pixel driving voltage is increased to reduce the operating current of each pixel, thereby achieving the purpose of reducing the brightness of the display panel Also, it is realized that when the image refresh rate of the display panel decreases, the brightness difference before and after the brightness increase is reduced, and the occurrence of flicker is avoided.

In the description of the present specification, descriptions with reference to the terms "one embodiment", "some embodiments", "exemplary embodiments", "examples", "specific examples" and the like refer to specific descriptions in conjunction with embodiments or examples. Features, structures, materials, or characteristics are included in at least one embodiment or example of the present disclosure. In the present specification, the schematic representation of the above-mentioned terms does not necessarily refer to the same embodiment or example. Moreover, the described specific features, structures, materials or characteristics can be combined in any one or more embodiments or examples in a suitable manner.

The above content is a further detailed description of the present disclosure in combination with specific embodiments, and it cannot be considered that the specific implementation of the present disclosure is limited to these descriptions. For those of ordinary skill in the technical field to which the present disclosure belongs, a number of simple deductions or substitutions can be made without departing from the concept of the present disclosure, which should be regarded as falling within the protection scope of the present disclosure.

The invention claimed is:

1. A driving method of a display panel, comprising steps of:
presetting a mapping database of correspondence between each of first voltages and a respective one of image refresh rates;
in response to a graphics processor detecting that the display panel is switched from a dynamic image to a static image, sending a refresh rate adjustment instruction to a timing controller;
switching, by the timing controller, the image refresh rate of the display panel from a first image refresh rate to a second image refresh rate according to the refresh rate adjustment instruction, and sending a voltage adjustment instruction to a power driving chip;
obtaining, by the power driving chip, the first voltage matching the second image refresh rate according to the voltage adjustment instruction and the mapping database;
obtaining a pixel driving voltage corresponding to the first voltage according to a preset correspondence between the first voltage and the pixel driving voltage; and
adjusting the display panel according to the pixel driving voltage to change an operating current of each pixel.

2. The driving method of the display panel according to claim 1, wherein the step of sending the refresh rate adjustment instruction to the timing controller comprises:
  determining, by the graphics processor, whether a seamless dynamic refresh rate switching technology is switched from an off state to an on state, and if so, determining that the display panel is switched from the dynamic image to the static image.

3. The driving method of the display panel according to claim 1, wherein the preset correspondence between the first voltage and the pixel driving voltage is:

$$V_{data} = GammaH - \frac{GammaH - GammaL}{2^{bit} - 1} * \text{Data},$$

wherein, $V_{data}$ represents the pixel driving voltage, GammaH is the first voltage, GammaL represents a minimum value of a Gamma voltage, bit represents a color depth, $2^{bit}$ represents a grayscale number of the display panel, and Data represents a coded data value of the Gamma voltage.

4. The driving method of the display panel according to claim 1, wherein
  the first voltage is a maximum value of the Gamma voltage; and
  in the mapping database, the first voltage increases as the image refresh rate decrease, and the first voltage decreases as the image refresh rate increases.

5. The driving method of the display panel according to claim 3, wherein
  the first image refresh rate is greater than the second image refresh rate, and the first voltage matching the second image refresh rate is greater than the first voltage matching the first image refresh rate.

6. The driving method of the display panel according to claim 5, wherein the step of adjusting the display panel according to the pixel driving voltage to change the operating current of each pixel comprises:
  setting a driving voltage of each pixel in the display panel to be the pixel driving voltage to reduce the operating current of each pixel.

7. The driving method of the display panel according to claim 6, wherein the operating current and the pixel driving voltage of each pixel satisfy a relationship of:

$$I = k * (ELVDD - V_{data})^2$$

where, I represents the operating current of each pixel, k is a fixed value greater than 0, and ELVDD represents a power supply voltage.

8. A driving device of a display panel, comprising:
  a database setting unit, configured to preset a mapping database of correspondence between each of first voltages and a respective one of image refresh rates;
  a refresh rate adjustment instruction sending unit, configured to, in response to a graphics processor detecting that the display panel is switched from a dynamic image to a static image, sending a refresh rate adjustment instruction to a timing controller;
  the timing controller, configured to switch the image refresh rate of the display panel from a first image refresh rate to a second image refresh rate according to the refresh rate adjustment instruction, and send a voltage adjustment instruction to a power driving chip;
  the power driving chip, configured to obtain the first voltage matching the second image refresh rate according to the voltage adjustment instruction and the mapping database;
  a pixel driving voltage determination unit, configured to obtain a pixel driving voltage corresponding to the first voltage according to a preset correspondence between the first voltage and the pixel driving voltage; and
  a display panel adjustment unit, configured to adjust the display panel according to the pixel driving voltage to change an operating current of each pixel.

9. The driving device of the display panel according to claim 8, wherein in response to the graphics processor detecting that a seamless dynamic refresh rate switching technology is switched from an off state to an on state, and detecting that the display panel is switched from the dynamic image to a static image, a refresh rate adjustment instruction is sent to the timing controller.

10. The driving device of the display panel according to claim 8, wherein the first voltage is a maximum value of a Gamma voltage.

11. The driving device of the display panel according to claim 8, wherein the preset correspondence between the first voltage and the pixel driving voltage is:

$$V_{data} = GammaH - \frac{GammaH - GammaL}{2^{bit} - 1} * \text{Data},$$

wherein, $V_{data}$ represents the pixel driving voltage, GammaH is the first voltage, GammaL represents a minimum value of a Gamma voltage, bit represents a color depth, $2^{bit}$ represents a grayscale number of the display panel, and Data represents a coded data value of the Gamma voltage.

12. The driving device of the display panel according to claim 8, wherein in the mapping database, the first voltage increases as the image refresh rate decrease, and the first voltage decreases as the image refresh rate increases.

13. The driving device of the display panel according to claim 11, wherein
  the first image refresh rate is greater than the second image refresh rate, and the first voltage matching the second image refresh rate is greater than the first voltage matching the first image refresh rate.

14. The driving device of the display panel according to claim 13, wherein the display panel adjustment unit is further configured to:
  set a driving voltage of each pixel in the display panel to be the pixel driving voltage to reduce the operating current of each pixel.

15. The driving device of the display panel according to claim 14, wherein the operating current and the pixel driving voltage of each pixel satisfy a relationship of:

$$I = k * (ELVDD - V_{data})^2$$

where, I represents the operating current of each pixel, k is a fixed value greater than 0, and ELVDD represents a power supply voltage.

* * * * *